United States Patent [19]

Protos

[11] 4,400,274

[45] Aug. 23, 1983

[54] SEPARATOR

[76] Inventor: Bill K. Protos, 151 Spring St., Newton, N.J. 07860

[21] Appl. No.: 277,146

[22] Filed: Jun. 25, 1981

[51] Int. Cl.³ .............................................. B01D 17/02
[52] U.S. Cl. .................................... 210/302; 210/305; 210/307; 210/314; 210/521
[58] Field of Search ........ 210/167, 253, 255, 299-302, 210/305, 307, 313, 320, 314, 340, 341, 515, 521, 522, 540, 132

[56] References Cited

U.S. PATENT DOCUMENTS

| 255,086 | 3/1882 | Redmond | 210/300 |
|---|---|---|---|
| 2,468,864 | 5/1949 | Campbell | 210/300 |
| 3,397,784 | 8/1968 | Carr | 210/132 |
| 3,407,937 | 10/1968 | Bakker et al. | 210/301 |
| 3,469,702 | 9/1969 | Perren | 210/301 |
| 3,731,802 | 5/1973 | James | 210/540 |
| 3,933,654 | 1/1976 | Middelbeek et al. | 210/521 |
| 4,116,835 | 9/1978 | Bertelson | 210/255 |
| 4,145,280 | 3/1979 | Middelbeek et al. | 210/300 |
| 4,149,973 | 4/1979 | Harris | 210/305 |

Primary Examiner—Peter A. Hruskoci
Attorney, Agent, or Firm—Thomas L. Adams

[57] ABSTRACT

A separator for separating low and high density constituents of a liquid includes a tank. The tank has a liquid inlet, an opposing liquid outlet and an upper side drain. A filter is mounted in the tank adjacent the inlet for filtering its discharging liquids. An input dam is located downstream of the filter and extends upward a given height. The drain is positioned to draw from locations downstream of the dam. In one embodiment, the tank has a top panel extending across the tank, its upper edge near the drain. The panel is inclined upwardly to cause an upward liquid flow. An internal baffle may be mounted across the tank between the outlet and the panel. This baffle is spaced from the bottom of the tank to provide an upwardly accelerating liquid flow.

6 Claims, 7 Drawing Figures

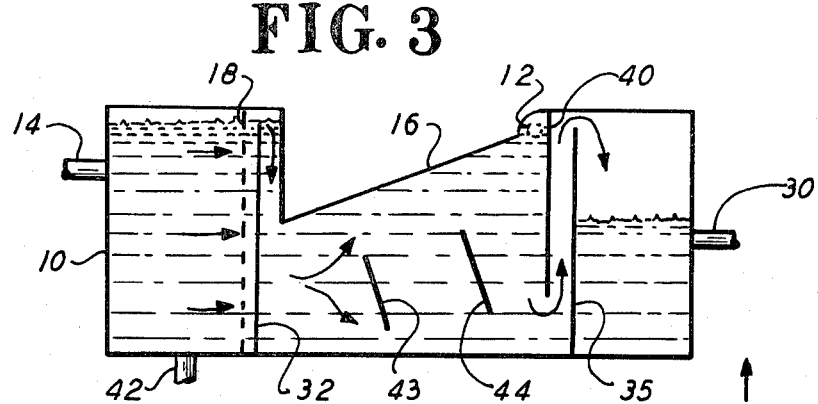
FIG. 3
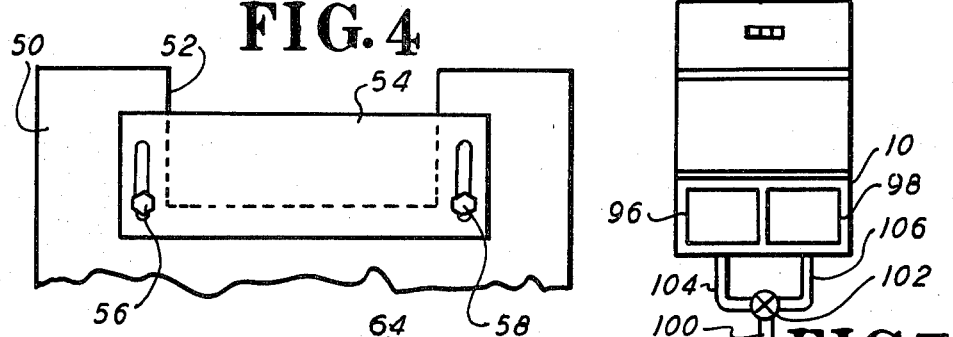
FIG. 4
FIG. 7
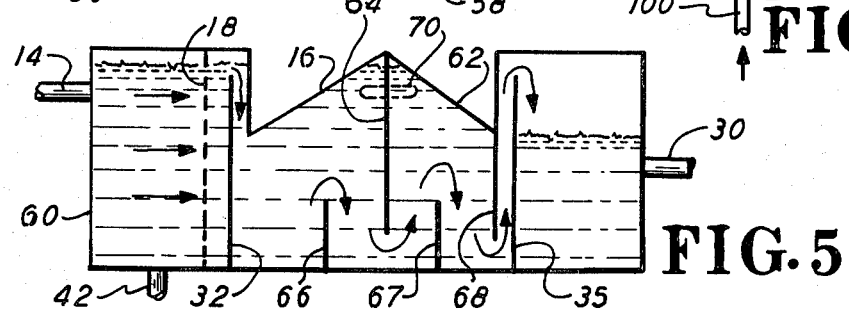
FIG. 5
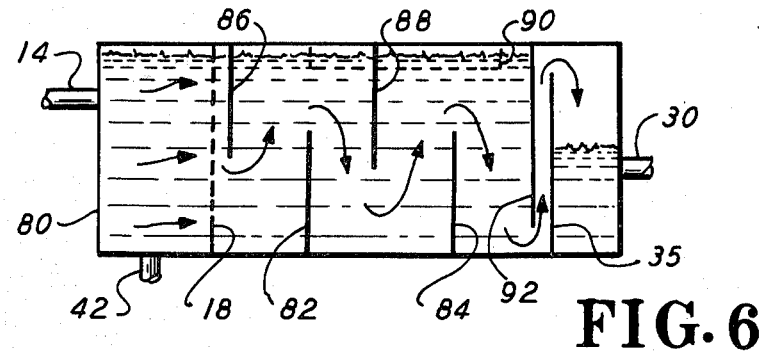
FIG. 6

SEPARATOR

BACKGROUND OF THE INVENTION

The present invention relates to separators for separating low and high density constituents of a liquid and, in particular, to a tank having baffles or dams and having an upper drain for removing lower density constituents.

It is known to employ a tank having a dam and a side vent downstream of the dam for separating grease from liquids. However, these systems fail to employ an input filter for eliminating in advance large particles suspended in the liquids. It is also known to have a tank with a dam but with a grease drain for low density constituents upstream of the dam. This latter tank, however, fails to take advantage of the separation caused by this dam so that the low density constituents are not adequately separated.

Because of these deficiencies the known separators thus far have been unable to fully and rapidly separate low density constituents such as grease from an incoming liquid. Accordingly, there is a need for a simple and effective device for separating low and high density constituents.

SUMMARY OF THE INVENTION

In accordance with the illustrative embodiments demonstrating features and advantages of the present invention, there is provided a separator for separating low and high density constituents of a liquid. The separator can employ a tank having a liquid inlet, an opposing liquid outlet and an upper side drain. A filter means is mounted in the tank adjacent to the inlet for filtering its discharging liquid. An input dam located downstream of the filter extends upward a given height. The drain is positioned to draw from locations downstream of the dam.

In a related embodiment of the same invention, a separator for separating low and high density constituents of a liquid includes a tank which has a liquid inlet, an opposing liquid outlet, a top panel extending across the tank and an upper drain near the upper edge of the panel. This panel is inclined upwardly to cause an upward liquid flow. The separator also has an internal baffle mounted across the tank between the outlet and the panel. This baffle is spaced from the bottom of the tank to produce an upwardly accelerating liquid flow.

By employing the separators just described an efficient separation is achieved. The drain can be proerly positioned so that it readily removes low density constituents from the liquid. In a preferred embodiment the dams and baffles are staggered to produce a serpentine flow path for rapidly separating low and high density constituents in a liquid. Also, embodiments employing an upwardly inclined upper panel produce a hydrostatic pressure tending to separate and drive low density constituents up the inclined face of the panel.

In a preferred embodiment the upper edges of the dams are notched and fitted with a sliding gate which regulates the effective height of the dam. This feature allows adjustment of the depth of liquid contained with the tank. In one embodiment, the tank has a final output chamber which is fed by the overflow from an output dam. A waterfall effect thereby produced, gives a visual indication of the quality of cleansing by the separator.

In one embodiment, the separator has a pair of adjacent, alternately selectable, filter baskets. A commutating valve selects one basket while the other is being cleaned. This feature allows continuous operation of the separator.

BRIEF DESCRIPTION OF THE DRAWINGS

The above brief description as well as other objects, features and advantages of the present invention will be more fully appreciated by reference to the following detailed description of the presently preferred but nonetheless illustrative embodiments in accordance with the present invention, taken in conjunction with the accompanying drawings wherein:

FIG. 3 is a sectional side view of the separator of FIG. 1;

FIG. 4 is a detailed view of a modified dam which may be used in the separator of FIG. 1;

FIG. 5 is a sectional side view of a separator which is an alternate to that of FIG. 1;

FIG. 6 is a side sectional view of a separator which is an alternate to that FIG. 1; and FIG. 7 is a top view of a separator which is an alternate to that of FIG. 1.

DETAILED DESCRIPTION OF THE PREFERRED EMBODIMENTS

Figure 1:
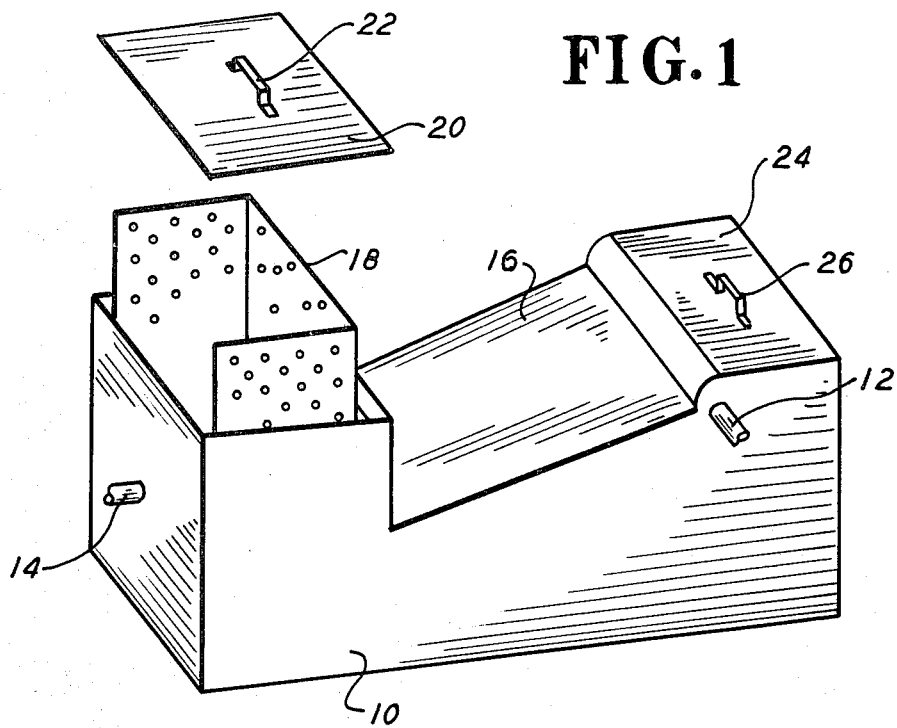
FIG. 1 is a perspective view of a separator according to the present invention.

Referring to a FIG. 1, a separator is shown employing a tank 10 having a rectangular bottom and two rectangular ends. Projecting from the side of tank 10 is an upper drain 12, a pipe communicating to the interior of tank 10. A liquid inlet 14 is shown herein as a pipe communicating to the interior of tank 10. A central top panel 16 in tank 10 extends over about one third of the length of tank 10 and is inclined upwardly in an upstream direction, that is in a direction away from inlet 14.

A filter means is shown herein as a three sided, perforated screen 18 mounted through an upper opening in tank 10 adjacent to inlet 14 (partially withdrawn for illustrative purposes). It is to be appreciated that in other embodiments different filters may be employed such as a mesh basket, a fibrous filtering panel etc. A cover 20 having a handle 22 is sized to cover the open chamber containing filter 18 when it is positioned fully within tank 10. Tank 10 is also shown with a similar cover 24 having a handle 26 to cover a downstream, upper opening at the opposite end of tank 10.

Figure 2:
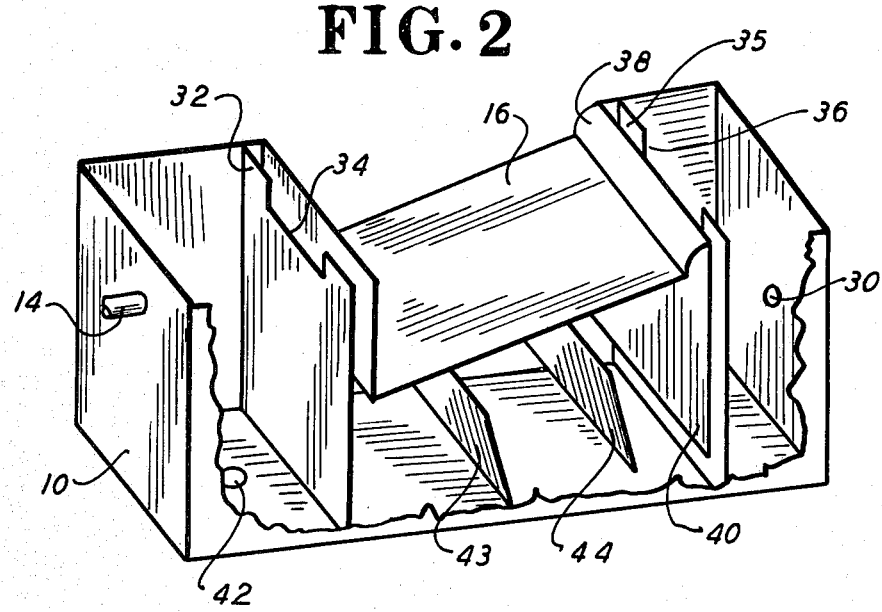
FIG. 2 is a perspective view of the separator of FIG. 1 with its side panel broken away to illustrate internal components.

Referring to FIG. 2, the separator of FIG. 1 is shown with its side broken away to expose internal components. In this view previously illustrated covers 20 and 24 as well as screen 18 have been removed from enhanced clarity of illustration. Visible in this view is liquid outlet 30 which is a port communicating to an external pipe leading from the end of tank 10. A vertical input dam 32 is shown herein mounted parallel to the face of tank 10 that supports inlet 14. This dam 32 has a notched edge 34. Also, mounted within tank 10 facing the end of tank supporting outlet 30 is output dam 35 also having a notched upper edge 36.

The upper edge of top panel 16 has a rolled edge 38 in the shape of a quadrant of a cylinder. Depending from the edge 38 of top panel 16 is vertical internal baffle 40 spaced from the bottom of tank 10. Between dam 32 and baffle 40 are a pair of spaced upstream baffles 43 and 44, each of them being planar surfaces tilted backwards. Baffles 43 and 44 are spaced from the top and bottom of tank 10 to provide an upper and a lower flow path.

Referring to FIG. 3, tank 10 is shown filled with a liquid, the liquid level between dam 35 and outlet 30 being lower than in the other portions of tank 10. Previously illustrated drain 12 is shown in phantom herein since it ordinarily would be cut away in this view. The flow of liquid is through screen 18, in front of the downstream face of dam 32, around baffles 43 and 44, between baffles 40 and dam 35 and cascading over dam 35 to be drawn finally through outlet 30. In this process, baffles 43 and 44 divide the liquid into an upward and downward flow path, causing acceleration which tends to enhance the separation of low and high density constituents. Furthermore, the low density constituents tend to be driven upward against the inside face of top panel 16 eventually reaching drain 12.

A modification is illustrated in FIG. 4 to the dams employed herein (for example, dams 32 and 35). In this modification, dam 50 has a notched upper edge 52 and gate 54 (referred to herein as either an input or output gate) having a pair of parallel slots near opposing edges of gate 54. Gate 54 is slidably attached to dam 50 by means of bolts 56 and 58 through the slots of gate 54. Thus mounted, gate 54 may be adjusted to alter the effective height of dam 50.

Referring to FIG. 5, an alternate embodiment is illustrated wherein tank 60 employs internal components similar to that illustrated in FIG. 1, namely: filter 18, dam 32, top panel 16, dam 35, outlet 30. In this embodiment however, tank 60 has contiguous to top panel 16 a downwardly inclined panel 62. Depending downwardly from the peak formed by the junction between panel 16 and 62 is baffle 64. Mounted on the bottom of tank 60 on both sides of baffle 64 are a pair of dams 66 and 67. Cut into the side of tank 60 near the peak formed by panels 16 and 62, and straddling baffle 64, is a drain, shown herein as a elongated slot 70. Drain 70 is shown in phantom since it is formed in the face of tank 50 which was removed for clarity of illustration.

It will be appreciated that the liquid flow in this embodiment is through screen 18, in front of the downstream face of dam 32, over dam 66, under baffle 64, over dam 67, under baffle 68, between baffle 68 and dam 35, and cascading over the top of dam 35 to be finally removed through outlet 30. Since the path of liquid in this embodiment follows a relatively serpentine path, the liquid tends to accelerate upward and then downward, thereby facilitating separation of high and low density constituents. The low density constituents tend to drift upward to the peak formed at the joint between panel 16 and 62 for removal by drain 70.

Referring to FIG. 6, another embodiment of a separator is illustrated employing tank 80 having certain components identical to that illustrated in FIG. 1, namely: filter 18, dam 35, inlet 14 and outlet 30. In this embodiment input dam 82 is mounted upstream of central dam 84. A pair of straddling baffles 86 and 88 are illustrated on both sides of input dam 82. An upper side drain 90 extends downstream of upstream dam 82 and straddles downstream baffle 88. Drain 90, shown in phantom, is cut in the side of tank 80 which has been cut away in this sectional view. Mounted between dam 84 and 35 is output baffle 92.

It will be appreciated that the fluid flow in the apparatus of FIG. 6 is through screen 18, under baffle 86, over dam 82, under baffle 88, over dam 84, under baffle 92 and over dam 35, cascading into a final chamber to be removed through outlet 30. Since the liquid flows in a serpentine fashion, alternately accelerating upwardly and downwardly, rapid selection of high and low density constituents occurs. The low density constituents are driven upwardly to drain 90 for removal.

Referring to FIG. 7, a modification is illustrated to the filter of FIG. 1. In this embodiment the previously illustrated screen has been replaced by a pair of adjacent catches 96 and 98. Catches 96 and 98 are in the form of mesh baskets. Commutating valve 102 can switch in incoming liquid of input line 100 to either one of a pair of lines 104 or 106 which feed corresponding ports in the face of tank 10. Lines 104 and 106 are at a sufficiently elevation so that the incoming liquid can fall into basket 96 or 98. The advantage of the foregoing apparatus is that valve 102 may be switched to feed one of the baskets while the other may be removed and cleaned. By alternating baskets in this fashion the separator can be run continuously.

It will be appreciated that the foregoing apparatus of FIGS. 1–7 may be connected to receive the waste from a sink or from some other process producing a liquid composed of a high and low density constituent. Typically, the low density constitutent will be a grease that tends to float to the top of the liquid. The low density constituent thus removed by the separator may be recycled. For example, the removed low density constituent may be a grease which can be reprocessed to produce soaps or other chemical products. Significantly, the cleansing performed by the separator disclosed herein can avoid clogging of drain systems since they need not carry large particulate matter or large amounts of grease.

It is to be appreciated that various modifications may be implemented with respect to the above described preferred embodiments. For example, the tanks,k dams and baffles disclosd herein may be composed of various sheet metals, plastics or other materials, depending upon the application. Furthermore, the size and relative proportion of various baffles, dams, and chambers may be altered depending upon the expected flow rate, composition of liquid, dwell time within the tank etc. It is also anticipated that the heights and depths of the dams and baffles may be altered to produce the desired degree of undulation of the fluid flow. This indulation may be altered to produce the desired degree of separation as well as to satisfy the necessary flow rate and pressure drop. It is also appreciated that the drain employed herein may be located at various positions including through an inclined top panel of the tank at a point below the water line. Moreover, the shape and size of this drain may be altered depending upon the length over which the draining is to occur. Also, the covers and lids employed herein may be loosely rested or tightly sealed to the tank to render the tank completely water tight. Furthermore, the tank may be partitioned into many additional chambers. Alternatively, several tanks may be connected in series to increase the overall extent of separation.

Obviously, many modifications and variations of the present invention are possible in light of the above teachings and it is therefore to be understood that within the scope of the appended claims, the invention may be practiced otherwise than as specifically described.

What is claimed is:

1. A separator for separating low and high density constituents of a liquid, comprising:
   a tank having a liquid inlet, an opposing liquid outlet, a top panel extending across said tank and an upper drain near the upper edge of said panel, said panel being inclined upwardly to cause an upward liquid flow;
   an internal baffle having an upstream and downstream side mounted across said tank between said outlet and said panel, said drain opening exclusively on said upstream side of said baffle, said baffle being spaced from the bottom of said tank to produce at said downstream side an upwardly accelerating liquid flow away from said drain;
   a filter means affixed adjacent said inlet for filtering its discharging liquid, said tank having between said filter means and said inlet a lower opening;
   an input and output dam mounted in said tank, each being spaced from the top of said tank, said outlet being spaced below the top of said output dam, whereby liquid cascades over said output dam; and
   a pair of spaced, upstream baffles mounted in said tank upstream of said internal baffle, said upstream baffles being tilted backwards.

2. a separator according to claim 1 wherein said panel has an upwardly inclining portion and wherein said internal baffle and said upwardly inclining portion of said panel are contiguous.

3. A separator according to claim 1 wherein said upstream baffles are spaced from the top and bottom of said tank.

4. A separator according to claim 1 wherein said input dam has a notched upper edge mounted in said tank between said filter means and said internal baffle, said input dam further comprising:
   an input gate slidably mounted on said input dam to cover said notched upper edge an adjustable amount.

5. A separator according to claim 1 or 4 wherein said output dam has a notched upper edge mounted in said tank downstream of said internal baffle, said output dam further comprising:
   an output gate slidably mounted on said output dam to cover said notched upper edge an adjustable amount, said outlet being spaced below the top of said output dam whereby cascading of liquid occurs over said gate.

6. A separator according to claim 1 wherein said inlet comprises:
   a pair of spaced ports;
   an input line; and
   a commutating valve for feeding said input line to either one of said ports, said filter means comprising a pair of adjacent catches, each positioned to filter liquid discharging from a different corresponding one of said ports, both of said catches commonly communicating to said drain, said outlet and said internal baffle.

* * * * *